UNITED STATES PATENT OFFICE.

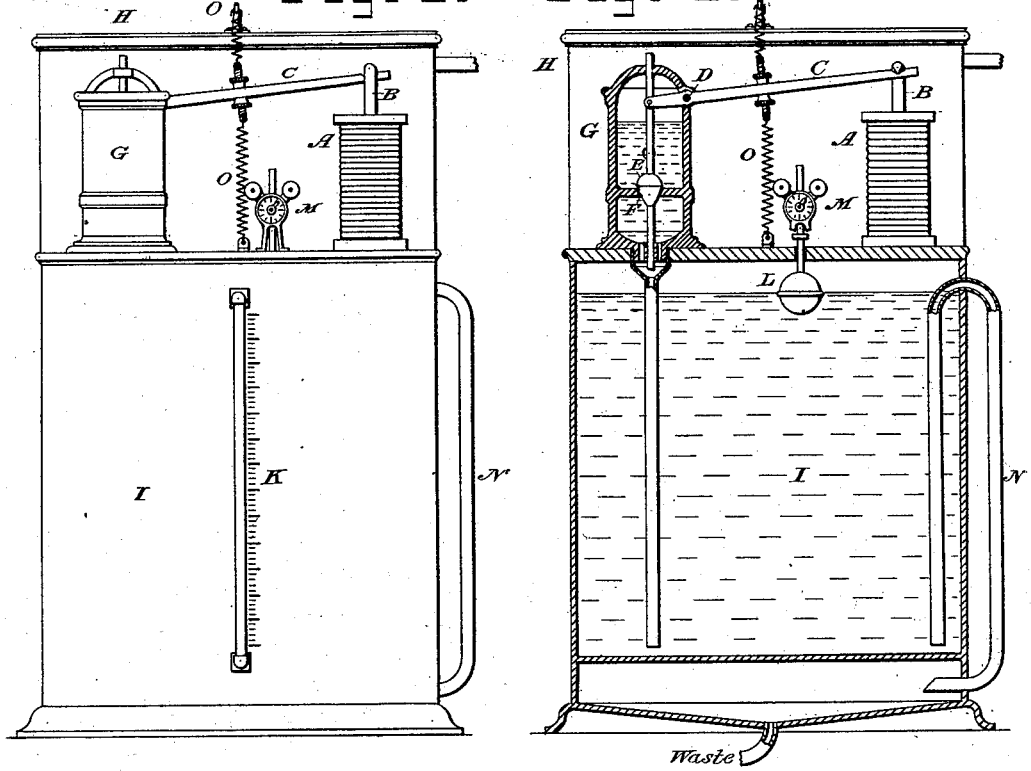
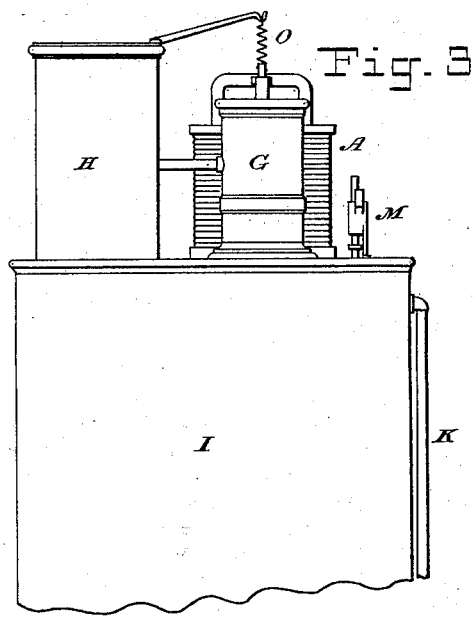
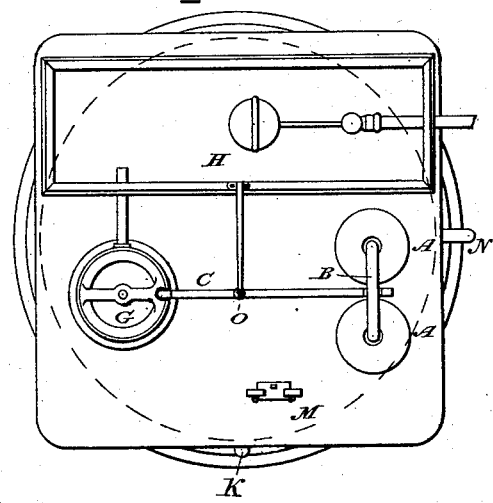

ST. GEORGE LANE FOX, OF LONDON, ENGLAND.

APPARATUS FOR MEASURING ELECTRIC CURRENTS.

SPECIFICATION forming part of Letters Patent No. 279,371, dated June 12, 1883.

Application filed November 27, 1882. (No model.) Patented in England November 14, 1878, No. 4,626.

*To all whom it may concern:*

Be it known that I, ST. GEORGE LANE FOX, of London, England, have invented certain Improvements in Apparatus for Measuring Electric Currents, of which the following is a specification.

This invention relates to apparatus for measuring electric currents by causing the variations in position of the core of the solenoid or the armature of an electro-magnet to control the action of counting or integrating apparatus, which is thus made to record the amount of current passing through the circuit in which or in a shunt from which the solenoid or magnet is intercalated. According to my invention the counting mechanism is controlled through the medium of water or other fluid, the flow of which is regulated by the opening of a valve to a greater or lesser extent, according to the position of the solenoid core or armature, so that the flow of fluid is proportioned at each instance to the strength of current traversing the coil.

In the annexed drawings, Figure 1 is a front elevation, Fig. 2 a vertical section, Fig. 3 a side elevation, and Fig 4 a plan, of an apparatus constructed according to my invention.

In these figures, A is a solenoid, the coil of which forms part of the circuit, or a shunted portion of the circuit of the conductor, the current passing through which is to be measured. The movable core B of this solenoid is attached to one end of a lever, C, which is pivoted at D, and is connected at its other end to the rod of a conical valve or plug, E. This valve E controls the flow of water through an outlet or passage, F, in the bottom of a vessel, G, which is kept charged at a constant level from a cistern, H. The water which flows through the outlet F is received in a tank, I. On the outside of this tank is a glass gage, K, for indicating the level of the water therein.

L is a float, which, when the water has risen to a given level at which there is an overflow, moves a counter or integrator, M, the distance of one tooth. Then a siphon, N, comes automatically into action so as to empty the tank I, which will then be again gradually filled by the water from the vessel G.

O O are springs for adjusting the lever C.

The action of the apparatus is as follows: When no current is passing through the coil of the solenoid the core B is in its highest position, and therefore the passage F is completely closed by the valve E; but when, on the other hand, a current is passing, the core B is more or less drawn down according to the strength of the current, and therefore the valve E is more or less raised by the lever C, and the flow of water from the vessel G into the tank I more or less great. By making each tooth of the counter M indicate a given number of units of quantity this counter, combined with the quantity of water in the tank I, as shown by the gage, will enable the amount of electricity which has passed through the solenoid up to any given time to be at once ascertained.

In establishments where a comparatively small amount of electricity would be required the arrangement for emptying the tank by means of the siphon can be dispensed with, because the tank would not become full between the periodical visits of the inspector, who would empty it after reading the gage. In places where water would be liable to freeze some other suitable fluid—such as a dilute glycerine—should be used.

What I claim, and desire to secure by Letters Patent, is—

1. In apparatus for measuring electric currents, a solenoid or electro-magnet whose coil forms part of the circuit or a shunted portion of the circuit of the conductor, the current passing through which is to be measured, a core or armature actuated by said solenoid or electro-magnet according to the strength of said current, a vessel supplied with water or other fluid and provided with an outlet, a regulating-valve to such outlet operated by said core or armature, and means of measuring the amount of fluid which fllows through said outlet, substantially as and for the purpose set forth.

2. In combination with the solenoid A and core B, the lever C, valve E, vessel G, outlet F, tank I, and gage K, substantially as herein set forth and shown.

3. The combination of the solenoid A, core

B, lever C, valve E, vessel G, outlet F, tank I, the float L, and counter M, substantially as and for the purposes set forth.

4. The combination of the solenoid A, core B, lever C, valve E, vessel G, outlet F, tank I, float L, counter M, and siphon N, substantially as set forth.

In witness whereof I have hereunto signed my name in the presence two subscribing witnesses.

ST. GEORGE LANE FOX.

Witnesses:
GEORGE C. BACON,
WILLIAM DAVID BARNETT.